United States Patent [19]

Frewer et al.

[11] 4,322,243

[45] Mar. 30, 1982

[54] COMBINATION METHOD AND DEVICE FOR GASIFYING COAL AND FOR REDUCING METAL ORES

[75] Inventors: Hans Frewer, Marloffstein; Rainer Müller; Ulrich Schiffers, both of Erlangen, all of Fed. Rep. of Germany

[73] Assignee: Kraftwerk Union Aktiengesellschaft, Mulheim, Fed. Rep. of Germany

[21] Appl. No.: 125,525

[22] Filed: Feb. 28, 1980

[30] Foreign Application Priority Data

Mar. 6, 1979 [DE] Fed. Rep. of Germany ....... 2908771

[51] Int. Cl.³ ........................... C07C 1/02; C21B 5/00
[52] U.S. Cl. ......................................... 75/34; 48/202; 48/210; 252/373
[58] Field of Search ................. 48/202, 210; 252/373; 75/34, 25, 60

[56] References Cited

U.S. PATENT DOCUMENTS

| | | | |
|---|---|---|---|
| 3,840,353 | 10/1974 | Squires | 48/210 |
| 3,928,023 | 12/1975 | Claflin | 75/25 |
| 4,004,896 | 1/1977 | Soo | 48/210 |
| 4,021,298 | 5/1977 | Jones | 48/210 |
| 4,050,908 | 9/1977 | McNamee | 48/210 |
| 4,158,637 | 6/1979 | Jones | 48/210 |

Primary Examiner—P. D. Rosenberg
Attorney, Agent, or Firm—Herbert L. Lerner; Laurence A. Greenberg

[57] ABSTRACT

Combination method for the gasification of coal and the reduction of metal ores involving hydrogenation gasification of coal to produce hydrocarbons and a coke component. The coke is subjected to steam gasification and the gas therefrom used to reduce ores. Spent gas from the reduction is treated to convert CO in the gas to $H_2$ and $CO_2$. The $CO_2$ is scrubbed out and the $H_2$ is sent to the hydrogenation gasification to hydrogenate the coal.

3 Claims, 1 Drawing Figure

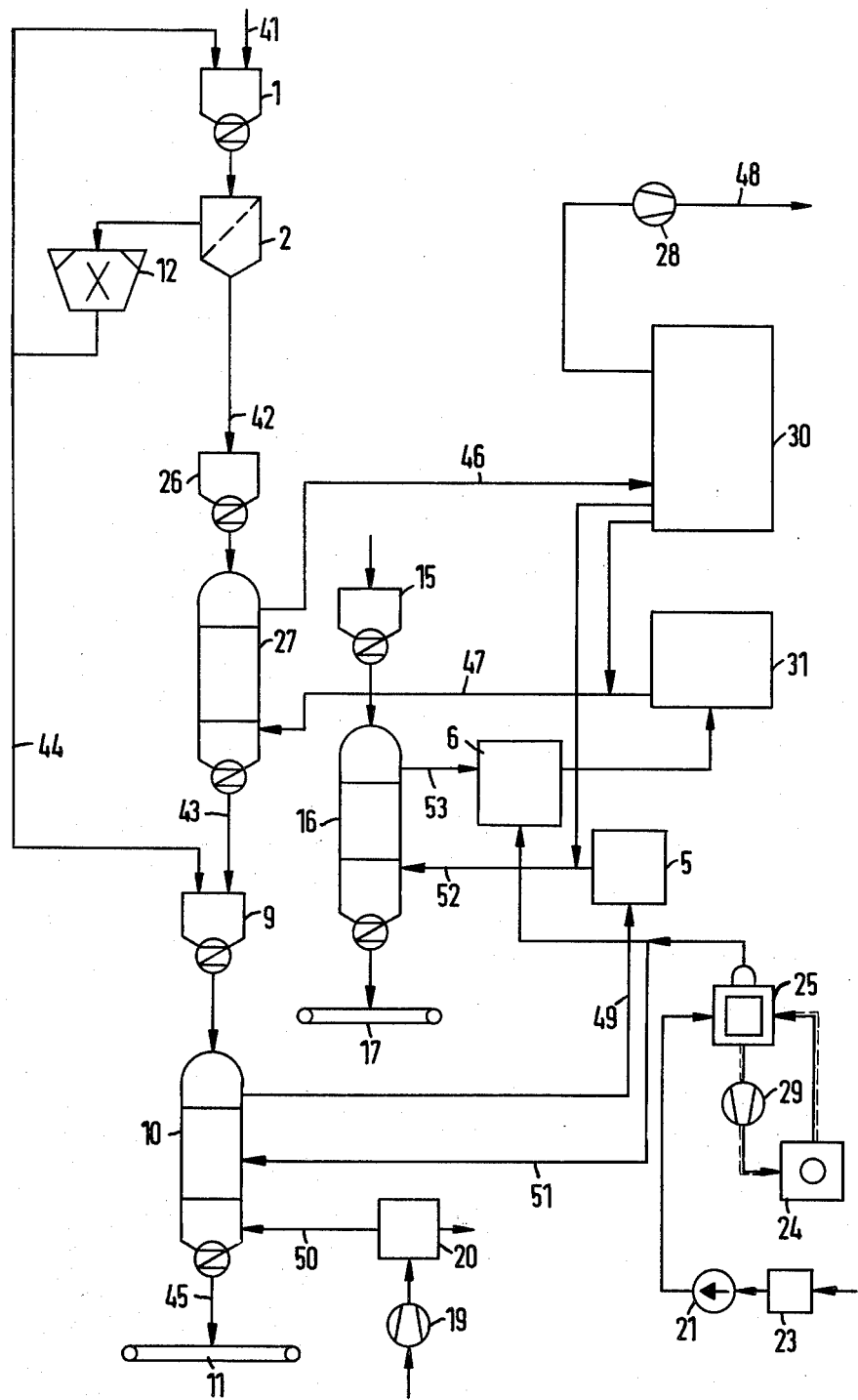

4,322,243

COMBINATION METHOD AND DEVICE FOR GASIFYING COAL AND FOR REDUCING METAL ORES

BACKGROUND OF THE INVENTION

1. Field of the Invention

The invention relates to a combination method and apparatus for the gasification of coal and the reduction of metal ores.

2. Description of the Prior Art

British Pat. No. 1,380,842 discloses treating carbon- or hydrocarbon-containing starting materials with steam generated in a nuclear reactor in order to produce a gas with high hydrogen content. This gas is used in a reduction furnace for reducing metal ores to metal.

German Pat. No. 26 09 320 describes a method for the gasification of coal in which a hydrogenation gasifier precedes a steam gasifier. In this method, a gas, the hydrogen content of which is used for the preceding hydrogenation gasification from which issues a gas with hydrogen and hydrocarbons, is generated in the steam gasifier. In this manner, a natural synthesis gas with a high hydrocarbon ($CH_4$, $C_2H_6$) content can be generated.

SUMMARY OF THE INVENTION

An object of the invention to provide a combination method in which the coal gasification and ore reduction can be carried out at substantially lower costs and which involves the treatment of the gases which are produced as intermediate products.

With the foregoing and other objects in view, there is provided in accordance with the invention a combination method for the gasification of coal and the reduction of metal ores which comprises subjecting a portion of comminuted coal to hydrogenation in a hydrogenation zone in the presence of added hydrogen to produce gaseous constituents containing hydrocarbons and unreacted hydrogen gas and a non-vaporous residual coke component, releasing the gaseous constituents from the hydrogenation zone, discharging the coke component from the hydrogenation zone, subjecting said coke component to steam gasification in a steam gasification zone in the presence of added steam to produce a steam gasification gas containing $H_2$, CO and $CO_2$ and an ash residue, passing said steam gasification gas in contact with a metal ore in a reduction zone to effect reduction of the ore, releasing spent gas containing CO after contact with said ore from the reduction zone, passing said spent gas to a conversion zone to react said CO with steam to produce $H_2$ and $CO_2$, passing the thus converted gas containing $H_2$ and $CO_2$ to a scrubbing zone to effect removal of $CO_2$, and feeding the converted gas containing $H_2$ after removal of $CO_2$ as well as a hydrogen containing gas separated from said released gaseous constituents, to the hydrogenation zone.

Other features which are considered as characteristic for the invention are set forth in the appended claims.

Although the invention is illustrated and described herein as embodied in a combination method and device for gasifying coal and for reducing metal ores, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus including hydrogenator gasifier, steam gasifier, reduction furnace, steam generator, and gas treatment plants.

DETAILED DESCRIPTION OF THE INVENTION

A hydrogenation gasifier precedes the steam gasifier. The stack gas or spent gas leaving the reduction furnace is treated in a conversion device with steam to increase the hydrogen content. The stack gas converted in the conversion device is fed to the hydrogenation gasifier via a scrubbing facility for reducing the carbon dioide content.

An embodiment example is shown schematically in the drawing. Furthermore, a table is attached, from which the composition as well as quantities of the materials used in the embodiment example can be seen. The columns in the table are designated with the same numerals as the corresponding streams of materials in the drawing.

The coal feed provided for gasification with the composition according to Column 41 of the Table is collected in the collecting tank 1 equipped with a suitable valve arrangement at the bottom to regulate the flow of coal therefrom. The coal then enters a sieve 2. There, the coarse-grain coal fraction which does not pass through a mesh sieve is separated and is comminuted in a mill 12. The comminuted material is returned to the collecting tank 1. Part of coal feed in the form of the fine-grain coal particles passing through the sieve 2 flows into an apportioning tank 26. The other part of the coal feed is conducted into a mixing tank 9. Sieve 2 is of 5/16 inch mesh size.

The composition of the coal entering the mixing tank 9 is given in column 44 of the Table, while the composition of the fine-grain coal provided for the apportioning tank 26 can be seen from Column 42 of the Table. The apportioning tank 26 is followed by a hydrogenation gasifier 27, to which hydrogen-containing gas in accordance with Column 47 of the Table is fed. In the hydrogenation gasifier, the volatile and easily reacted components of the coal are reacted together with hydrogen in known manner, to form hydrocarbons. The composition of the raw gas leaving the hydrogenation gasifier 27 is given in Column 46 of the Table.

The residual coke produced in the hydrogenation gasifier 27 with the composition according to Column 43 of the Table is likewise transported into a mixing tank 9 where it is mixed with the coal from sieve 2. In the mixing, the hot residual coke cools down and the coal taken from the sieve 2 is warmed up, so that a preheated coal-coke mixture leaves the mixing tank 9 and is introduced into the following steam gasifier 10.

Into the steam gasifier 10 is fed steam according to Column 51 of the Table. This steam is taken from steam generator 25 which is heated by the closed cooling circuit, maintained by a helium blower 29, of a high-temperature nuclear reactor 24. The feed water is pumped into the steam generator 25 by a feed pump 21 via a feed water treatment plant 23. Oxygen according to Column 50 of the Table flows into the lower part of the steam gasifier 10 through an oxygen line. The oxygen is taken from an air separation plant 20 which receives air by means of an air compressor 19. The nitrogen separated in plant 20 can be fed to a gas processing plant or discharged into the environment. The solid residue or ash of the gasification according to Column 45 of the Table is discharged from gasifier 10 onto a conveyor device 11.

In the steam gasifier 10, the gasifiable components of the coal are reacted with steam in known manner, to form a raw gas according to Column 49 of the Table. This gas is made-up of a large percentage of hydrogen and substantial percentages of carbon oxide (CO) and carbon dioxide ($CO_2$). This raw gas is transported into a gas-processing plant 5 in which the water and carbon dioxide contained in the gas are largely separated, i.e. more than 50% of these constituents removed. The gas from the gas processing plant 5 is mixed with gas containing carbon monoxide and hydrogen from a gas-processing plant 30 following the hydrogenation gasifier. The resultant mixture of gases with a composition according to Column 52 of the Table flows into a reduction furnace 16. Metallic ore is supplied to reduction furnace 16 from collecting tank 15. The solid components produced in the reduction of the metal ore are removed via a conveyor belt 17. In the reduction furnace, the carbon oxide (CO) and the hydrogen ($H_2$) react with the metal ore, and carbon dioxide and steam are formed.

Greatly simplified, the following reactions occur:

$$Fe_2O_3 + 3H_2 \rightarrow 2Fe + 3H_2O$$

$$Fe_2O_3 + 3CO \rightarrow 2Fe + 3CO_2.$$

This gives the stack gas or spent gas leaving the reduction furnace 16 the composition according to Column 53 of the Table. The stack gas is fed to a converting facility 6. The converting facility 6 is further connected to the steam generator 25 for supplying steam. Essentially the following reaction takes place:

$$CO + H_2O \rightarrow H_2 + CO_2.$$

The major part of the carbon dioxide is separated in a scrubbing device 31 connected between the converting facility 6 and the hydrogenation gasifier 27 and mixed with hydrogen-rich gas from the gas-processing plant 30. The mixture with a composition according to Column 47 is fed as hydrogenation gas to the hydrogenation gasifier 27, where it is reacted with the volatile and easily reacted components of the coal to form a hydrocarbon-containing raw gas according to column 46.

In a gas-processing plant 30 which functions in known manner to separate entering gases into desired components or mixture 4, the remaining hydrogen is removed and the synthesis natural gas is taken away as the useful gas with the composition according to Column 48 of the Table, via gas compressor 28.

The new combination of a coal gasification method with a metal oxide reduction method not only uses the gas generated in the steam gasifier for reducing the metal ore, but also uses this gas after it has served its purpose of reducing ore and become spent gas or stack gas, and after simple conversion of the stack gas, as input gas of a hydrogenation gasifier, and thus also makes it possible to have a hydrogenation gasifier precede the steam gasifier. In addition to the reduction of the metal ore, optimum coal gasification by additional hydrogenation gasification is therefore achieved without losing the advantage of using the raw gas obtained from the steam gasification as reducing gas. Other carbon-containing raw materials such as oil shale, extracts, petroleum cokes, etc. can also be used besides various grades of coal as starting material for the gasification.

| | 41 Raw Hard Coal kg/s | 42 Hard Coal Fine-grain Fraction kg/s | 43 Residual Coke kg/sec |
|---|---|---|---|
| C | 105.9 | 80.2 | 29.5 |
| H | 6.2 | 4.7 | 0.4 |
| O | 8.7 | 6.6 | 0.05 |
| N | 1.9 | 1.4 | 0.1 |
| S | 1.2 | 0.9 | 0.3 |
| Ash | 14.8 | 11.2 | 9.2 |
| $H_2O$ | 8.8 | 6.7 | — |
| | 147.5 | 111.7 | 39.55 |

| | 44 Hard Coal Medium-grain Fraction kg/s | 45 Ash kg/s |
|---|---|---|
| C | 25.7 | 3.5 |
| H | 1.5 | — |
| O | 2.1 | — |
| N | 0.5 | — |
| S | 0.3 | — |
| Ash | 3.6 | 14.8 |
| $H_2O$ | 2.1 | — |
| | 35.8 | 18.3 |

| | 46 Raw Gas Hydrogen Gasification | | 47 Hydr. Gas | | 48 Natural Synthesis Gas | |
|---|---|---|---|---|---|---|
| | $m^3/s$ | Mol-% | $m^3/s$ | Mol-% | $m^3/s$ | Mol-% |
| $CO_2$ | 0.3 | 0.1 | 1.3 | 0.5 | — | — |
| CO | 11.2 | 4.6 | 8.6 | 3.1 | 0.1 | 0.1 |
| $H_2$ | 155.1 | 63.1 | 255.4 | 90.8 | — | — |
| $CH_4$ | 70.0 | 28.4 | 9.7 | 3.4 | 68.4 | 96.4 |
| $C_2H_6$ | 2.5 | 1.0 | 0.6 | 0.2 | 2.5 | 3.5 |
| $N_2$ | 6.6 | 2.7 | 5.7 | 2.0 | — | — |
| $H_2S$ | 0.3 | 0.1 | — | — | — | — |
| | 246.0 | | 281.3 | | 71.0 | |
| P[bar] | 78 | | 80 | | 70 | |
| T[°C.] | 900 | | 700 | | 30 | |

| | 49 Raw Gas Steam Gasific'n. | | 52 Reduction Gas | | 53 Stack Gas | |
|---|---|---|---|---|---|---|
| | $m^3/s$ | Mol-% | $m^3/s$ | Mol-% | $m^3/s$ | Mol-% |
| $CO_2$ | 37.4 | 16.8 | 4.9 | 2.4 | 30.8 | 19.2 |
| CO | 70.5 | 31.8 | 74.7 | 33.7 | 48.5 | 30.2 |
| $H_2$ | 103.2 | 46.2 | 106.1 | 53.6 | 68.8 | 42.9 |
| $CH_4$ | 8.2 | 3.7 | 8.4 | 4.3 | 8.4 | 5.2 |
| $C_2H_6$ | 0.6 | 0.3 | 0.6 | 0.3 | 0.6 | 0.4 |
| $N_2$ | 1.9 | 0.8 | 3.3 | 1.7 | 3.3 | 2.1 |
| $H_2S$ | 0.5 | 0.2 | — | — | — | — |
| | 222.3 | | 198.0 | | 160.4 | |
| P[bar] | 10 | | 3.0 | | 2.0 | |
| T[°C.] | 600 | | 900 | | 500 | |

50 Oxygen for Steam Gasification:
24.0 $m^3/s$ (5% $N_2$, 95% $O_2$)
51 Steam for Steam Gasification:

| | 49 Raw Gas Steam Gasific'n. | | 52 Reduction Gas | | 53 Stack Gas | |
|---|---|---|---|---|---|---|
| | m³/s | Mol-% | m³/s | Mol-% | m³/s | Mol-% |
| 143 kg/s (30 bar, 400° C.) | | | | | | |

There are claimed:

1. Combination method for the gasification of coal and the reduction of metal ores which comprises subjecting comminuted coal to hydrogenation in a hydrogenation zone in the presence of added hydrogen to produce gaseous constituents containing hydrocarbons and unreacted hydrogen gas and a non-vaporous residual coke component, releasing the gaseous constituents from the hydrogenation zone, discharging the coke component from the hydrogenation zone, subjecting said coke component to steam gasification in a steam gasification zone in the presence of added steam to produce a steam gasification gas containing $H_2$, CO and $CO_2$ and an ash residue, passing said steam gasification gas in contact with a metal ore in a reduction zone to effect reduction of the ore, releasing spent gas containing CO after contact with said ore from the reduction zone, passing said spent gas to a conversion zone to react said CO with steam to produce $H_2$ and $CO_2$, passing the thus converted gas containing $H_2$ and $CO_2$ to a scrubbing zone to effect removal of $CO_2$, and feeding the converted gas containing $H_2$ after removal of $CO_2$ as well as a hydrogen containing gas separated from said released gaseous constituents, to the hydrogenation zone.

2. Combination method according to claim 1, wherein said steam gasification gas is, prior to said contact with a metal ore, treated to remove a majority of the $CO_2$ contained in said steam gasification gas.

3. Combination method according to claim 1, wherein comminuted coal feed is directed to the steam gasification in an amount of coal sufficient to provide adequate $H_2$ for hydrogenation gasification and reduction of ore.

* * * * *